(12) United States Patent
DeMarco

(10) Patent No.: US 7,902,993 B2
(45) Date of Patent: Mar. 8, 2011

(54) DETECTING COMPONENT REMOVAL

(75) Inventor: Stephen Michael DeMarco, Round Rock, TX (US)

(73) Assignee: Dresser, Inc., Addison, TX (US)

( * ) Notice: Subject to any disclaimer, the term of this patent is extended or adjusted under 35 U.S.C. 154(b) by 283 days.

(21) Appl. No.: 11/846,356

(22) Filed: Aug. 28, 2007

(65) Prior Publication Data

US 2009/0058641 A1 Mar. 5, 2009

(51) Int. Cl.
G08B 21/00 (2006.01)
(52) U.S. Cl. .............. 340/686.1; 340/571; 340/669; 340/670; 340/671; 340/689; 705/64; 705/73
(58) Field of Classification Search ............. 340/686.1
See application file for complete search history.

(56) References Cited

U.S. PATENT DOCUMENTS

| | | | |
|---|---|---|---|
| 6,442,448 B1 | 8/2002 | Finley et al. | |
| 6,494,456 B2 | 12/2002 | Faith | |
| 6,531,962 B2 | 3/2003 | Sudolcan | |
| 6,814,283 B2 | 11/2004 | Fujimoto | |
| 6,970,095 B1 * | 11/2005 | Lee et al. | 340/669 |
| 2001/0056543 A1 | 12/2001 | Isomura | |
| 2002/0156704 A1 | 10/2002 | Kolls | |
| 2003/0014660 A1 * | 1/2003 | Verplaetse et al. | 713/200 |
| 2004/0046675 A1 * | 3/2004 | Murata | 340/686.1 |
| 2005/0039040 A1 | 2/2005 | Ransom et al. | |
| 2006/0031180 A1 | 2/2006 | Tamarkin et al. | |
| 2006/0169764 A1 | 8/2006 | Ross et al. | |
| 2006/0255148 A1 | 11/2006 | Barkan et al. | |
| 2006/0258422 A1 | 11/2006 | Walker et al. | |
| 2007/0069018 A1 | 3/2007 | Dearing et al. | |
| 2007/0075127 A1 | 4/2007 | Rosenberg | |
| 2008/0154427 A1 * | 6/2008 | Siler | 700/232 |

FOREIGN PATENT DOCUMENTS

| | | |
|---|---|---|
| DE | 10102283 A1 | 9/2001 |
| EP | 0580297 A2 | 1/1994 |
| WO | WO 01/37236 A1 | 5/2001 |
| WO | WO 03/007676 A2 | 1/2003 |
| WO | WO 2007/059004 A2 | 5/2007 |

OTHER PUBLICATIONS

Analog Devices, Inc., ADXL202/ADXL210 Data Sheet.*
Notification of Transmittal of the International Search Report and the Written Opinion of the International Searching Authority (3 pages), International Search Report (4 pages), and Written Opinion of the International Searching Authority (6 pages) for related International Application No. PCT/US2008/073161, dated Nov. 13, 2008.
EPO Communication for related European Application No. 08 797 887.0, dated Sep. 1, 2010 (7 pages).

* cited by examiner

*Primary Examiner* — Benjamin C Lee
*Assistant Examiner* — Curtis J King
(74) *Attorney, Agent, or Firm* — Fish & Richardson P.C.

(57) ABSTRACT

Component removal detection may be accomplished by a variety of systems and techniques. In one embodiment, a system for component movement detection may include a payment module, a fuel dispenser, and a movement detection device. The fuel dispenser may receive the payment module and enclose the payment module at a first position defined by a fixed position of the payment module relative to the fuel dispenser. The movement detection device may be communicably coupled to the payment module and may detect a first value at the first position and a second value at a second position of the payment module, where the second position may be different from the first position. Further, the movement detection device may transmit the second value to the payment module, where the payment module may activate a security measure based upon a difference in the first and second values greater than an adjustable absolute limit.

25 Claims, 3 Drawing Sheets

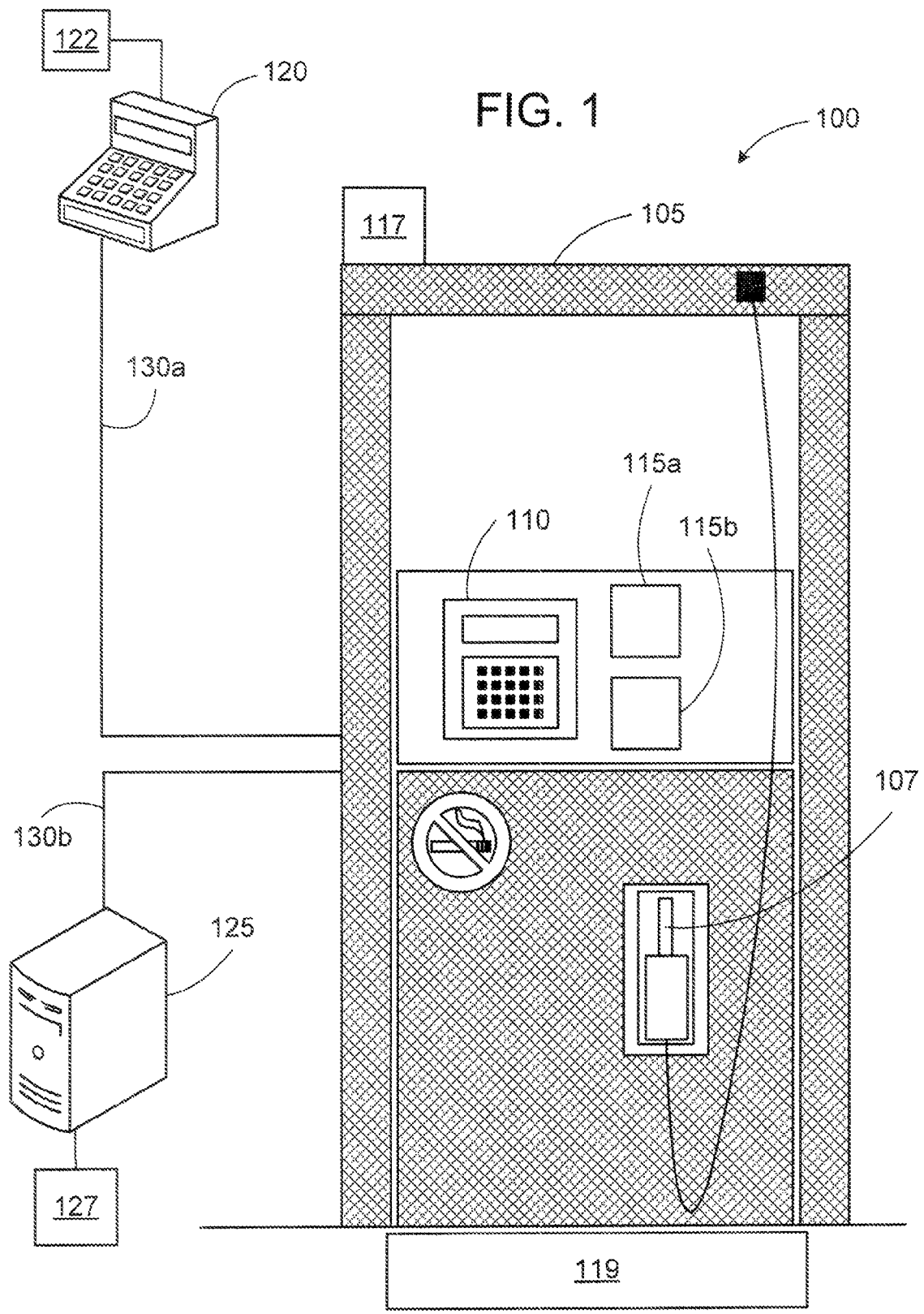

DETECTING COMPONENT REMOVAL

TECHNICAL FIELD

This disclosure relates to detecting component removal, and more particularly, to systems and techniques for detecting component removal from a fuel dispenser.

BACKGROUND

The retail petroleum industry utilizes various types of fuel dispensers for dispensing fuel to customers. In recent years, the retail petroleum industry has faced an increasing number of attempts at tampering and other security breaches aimed at intercepting personal and financial information of retail customers. The techniques involved in compromising a customer's personal and financial information can range from the simple, such as "shoulder surfing" as the customer enters the personal or financial information into the fuel dispenser, to more sophisticated and complex techniques, such as intercepting one or more electronic representations of the customer's personal or financial information as it is transmitted from the fuel dispenser to a variety of locations, such as a point-of-sale (POS) terminal in a retail fueling location or even a computer located at a payment card provider's location. Moreover, there may be other techniques for compromising sensitive information stored on the fuel dispenser, including customers' personal or financial information.

In response to the growing concern of tampering and other security breaches, fuel dispensers may include security devices to help ensure that, in particular, customer personal or financial information and sensitive data stored on the fuel dispenser remain secure. However, the current security devices may provide less than adequate protection for the sensitive data stored on the fuel dispenser. For example, a person determined to defeat the security devices installed on the fuel dispenser may accomplish this task by permanently removing a particular component from the fuel dispenser on which the sensitive data is stored. Furthermore, even if the security devices are designed to prevent the removal of the particular component on which the sensitive data is stored, a thief may still circumvent the security devices by, for example, stealing larger portions of the fuel dispenser encompassing the particular component.

SUMMARY

This disclosure relates to detecting component removal, and more particularly, to systems and techniques for detecting component removal from a fuel dispenser.

In one general aspect, a system for component movement detection may include a payment module, a fuel dispenser, and a movement detection device. The fuel dispenser may receive the payment module and enclose the payment module at a first position. The first position may be defined by a fixed position of the payment module relative to the fuel dispenser. The movement detection device may be communicably coupled to the payment module and may detect a first value at the first position and a second value at a second position of the payment module, where the second position may be different from the first position. Further, the movement detection device may transmit the second value to the payment module, where the payment module may activate a security measure based upon a difference in the first and second values greater than an adjustable absolute limit.

In particular aspects, the movement detection device may be integral with, or attached to, the payment module. Also, in some aspects, the movement detection device may be an accelerometer. The accelerometer may be a low g, three-axis accelerometer. In some aspects, the payment module includes one or more secure keys and may erase the secure keys upon activation of the security measure.

In some specific aspects, the system may include a bypass device communicably coupled to the movement detection device and the payment module. The bypass device may prevent activation of the security measure based upon a value average less than an adjustable threshold value. The value average may be an average of sixteen values, where the values represent magnitude of acceleration of the payment module values. In some aspects, the first and second values may be representative of degree of rotation values of the payment module about an axis of rotation, or magnitude of acceleration of the payment module values. In certain specific aspects, the adjustable absolute limit may be approximately equal to five degrees of rotation. The adjustable absolute limit may also be approximately equal to 0.1 g. In some aspects, the bypass device may be a digital low pass filter.

In certain aspects, the payment module may activate an alarm upon activation of the security measure. The alarm may be located at one or more of a remote monitoring location, the fuel dispenser, and a point of sale terminal. The point of sale terminal may be communicably coupled to the fuel dispenser. Also, in some specific aspects, the payment module may disable a fuel dispenser fueling mechanism upon activation of the security measure.

In other general aspects, a system for component movement detection may include a fuel dispenser module, a fuel dispenser, and a movement detection device. The fuel dispenser may receive the fuel dispenser module and enclose the fuel dispenser module at a first position. The first position may be defined by a fixed position of the fuel dispenser module relative to the fuel dispenser. The movement detection device may be communicably coupled to the fuel dispenser module and a processor and may detect a first value at the first position and a second value at a second position of the fuel dispenser module. The second position may be different from the first position. The movement detection device may also transmit the second value to the processor. The processor may activate a security measure based upon a difference in the first and second values greater than an adjustable absolute limit.

In more specific aspects, the movement detection device includes a low g, three-axis accelerometer. Also, the fuel dispenser module may be a cash receptor, a payment module, a pulser, or fuel dispenser component for which tampering or removal is a concern.

Various implementations may include one or more features. For example, the system for component movement detection may prevent a theft of sensitive data, as well as customers' personal or financial information, by preventing the removal of a fuel dispenser component. As another example, the system for component movement detection may allow for a more complex security system for fuel dispenser components, thus deterring a possible attempted theft or tampering of the sensitive data. As yet another example, the system for component movement detection may prevent the theft of sensitive data while still allowing the fuel dispenser and payment module to function normally during all environmental conditions and service calls.

These general and specific aspects may be implemented using a device, system, or method, or any combinations of devices, systems, or methods. The details of one or more implementations are set forth in the accompanying drawings and the description below. Other features will be apparent from the description and drawings, and from the claims.

DESCRIPTION OF DRAWINGS

FIG. 1 illustrates one system for detecting component removal;

Like reference symbols in the various drawings indicate like elements.

DETAILED DESCRIPTION

Figure 2A:
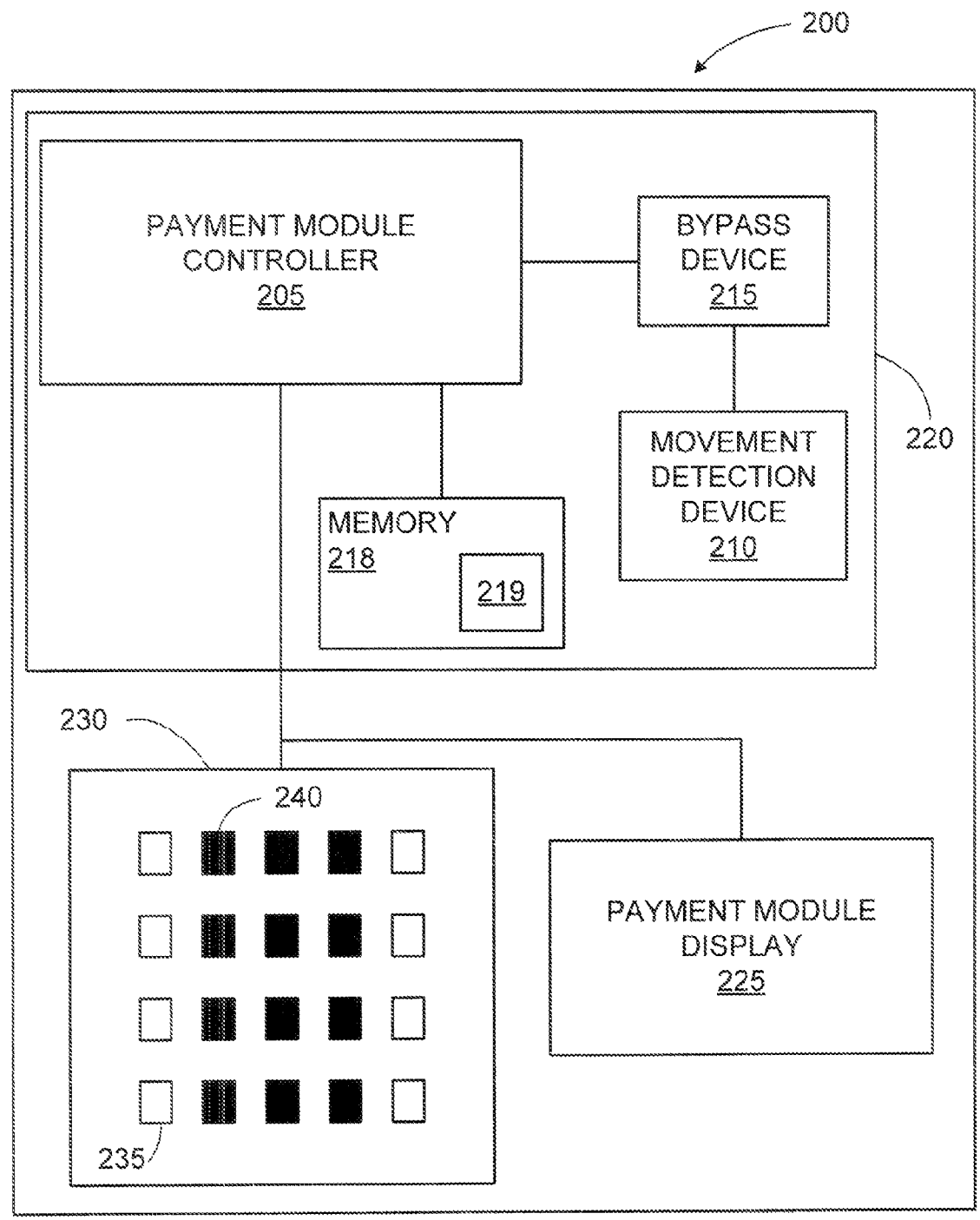
FIG. 2A is a block diagram illustrating one implementation of a payment module for use in a system for detecting component removal.

Detection of the removal of a component from a larger electronic or electromechanical device is critical in many modern applications, including, for example, in retail fuel dispensing. Particularly, a fuel dispenser may include a payment module component, the security of which may be a concern for both fuel dispenser manufacturers and fuel retailers who utilize such dispensers in order to provide fuel (e.g., unleaded gasoline, diesel, and ethanol) to its customers. In particular, the payment module may include one or more secure keys, which, generally, are accessed in order to encrypt and decrypt data transmitted to and received from various components of the fuel dispenser or components of the fuel dispensing environment. The secure keys may be valuable to potential thieves or persons attempting to tamper with the fuel dispenser due to, for example, the ability of the thieves to compromise a customer's personal or financial information through the use of the secure keys. A movement detection device may be utilized to detect an unauthorized movement of the payment module, such as, for example, a removal of the payment module from the fuel dispenser by a thief. For instance, the movement detection device may detect an unauthorized rotation or displacement of the payment module and further, may transmit an electronic signal representative of the rotation or displacement of the payment module to the payment module so that a security feature may be initiated.

FIG. 1 illustrates a system 100 for component removal detection in a fuel dispensing environment. System 100 includes a fuel dispenser 105, point-of-sale (POS) terminal 120, remote monitoring server 125, and communication links 130a and 130b. Generally, system 100 allows for the supply, payment, and monitoring of one or more types of fuel in a retail, fleet fueling or other commercial environment while simultaneously allowing for the detection of an unauthorized removal or movement of one or more components of fuel dispenser 105 and subsequent initiation of a security feature.

Fuel dispenser 105 includes a nozzle 107, a payment module 110, multiple fuel dispenser components 115a and 115b, a visual and/or auditory indicator 117, and a pumping mechanism 119. Generally, fuel dispenser 105 allows for a retail consumer or other purchaser to dispense fuel, e.g., unleaded gasoline, diesel, ethanol, or natural gas, into a private or public vehicle, and, in some aspects, allows for the payment of the fuel and generation of a receipt to the consumer. Fuel dispenser 105 may also, in some aspects, allow for directed advertising to the consumer for the cross-marketing of other products generally provided at a retail fueling environment, such as system 100. For example, fuel dispenser 105 may allow a retail consumer to purchase cross-marketed products, such as a car wash or food and drink products, or, in other aspects, the fuel dispenser 105 may function as an automated teller machine (ATM).

Fuel dispenser 105 communicates to POS terminal 120 and remote monitoring server 125 through communication links 130a and 130b, respectively. Communication links 130a and 130b, generally, allow for and facilitate the transmission of electronic data to and from the components of system 100. More specifically, communication links 130a and 130b may be any form of wired communication, such as an RS-232 serial connection, a universal serial bus (USB) connection, all or a portion of a Local Area Network (LAN), a portion of a Wide Area Network (WAN), a modem or broadband connection, or a portion of the global network known as the Internet. Moreover, communication links 130a and 130b may utilize wireless communication, such as, for example, IEEE 802.11, Bluetooth, WiMax, or other radio frequency (RF) or infra red (IR) format. Fuel dispenser 105 may also communicate through wired or wireless signals to other systems, such as a credit or debit card payment system network, or other third party payment verification services.

Nozzle 107 is utilized for dispensing fuel, stored in underor above-ground storage facilities, to the consumer's vehicle or portable fuel enclosure. Generally, nozzle 107 is connected through a flexible conduit to a pumping mechanism 119, which pumps the consumer-chosen fuel from the storage facility through the nozzle 107 upon activation of the nozzle 107. One nozzle 107 is illustrated as integral to fuel dispenser 105, as shown in FIG. 1, however, fuel dispenser 105 may have multiple nozzles 107, each of which may dispense one or more distinct fuel types.

Continuing with FIG. 1, payment module 110 is shown integral to fuel dispenser 105. Generally, payment module 110 fits within an enclosure of fuel dispenser 105 and is secured within fuel dispenser 105. In particular aspects, the payment module 110 may be mounted on a locked, hinged access door of the fuel dispenser 105, such that access to the payment module 110 may be achieved by unlocking and opening the door. Further, payment module 110 may provide a tamper-resistant and/or tamper-sensitive enclosure for storing sensitive data, such as, for example, cryptographical data relevant to providing secure communications among and between the components of fuel dispenser 105, the POS terminal 120, and the remote monitoring server 125. The secure communications, generally, include sensitive data, such as customer financial and personal information, to be transmitted to the POS terminal 120, remote monitoring server 125, or a payment verification system (e.g., credit or debit card provider network or a financial institution network).

Fuel dispenser components 115a and 115b are also shown integral to fuel dispenser 105 and are representative of fuel dispenser components typically found in a retail fuel dispenser, such as fuel dispenser 105. Although two fuel dispenser components 115a and 115b are illustrated as integral to fuel dispenser 105, fewer or greater fuel dispenser components may be included in fuel dispenser 105, as appropriate. Moreover, fuel dispenser components 115a and 115b may be separate from yet communicably coupled to fuel dispenser 105. Fuel dispenser components 115a and 115b may include, for example, a card reader (e.g., a magnetic card reader, a smart card or integrated circuit card (ICC) reader, or a Radio Frequency Identification (RFID) card reader), a customer display, a keypad, a barcode scanner, a receipt printer, a soft key module, a biometric device, a cash receptor; a pulser (i.e., a fuel meter), or other common retail fueling environment component. Fuel dispenser components 115a and 115b may be directly connected to payment module 110 within fuel dispenser 105 by a variety of communication devices and techniques, such as, for example, an RS-485 serial connection, an Ethernet connection, or other suitable connection. In particular aspects, one or both of the fuel dispensing components 115a and 115b may be secured within fuel dispenser 105 such that an unauthorized removal or tampering of the components 115a and 115b activates a security feature of the fuel dispenser. The security feature may be, for example, the activation of visual and/or auditory indicator 117 or the disabling of pumping mechanism 119.

Visual and/or auditory indicator 117 is located on the structure of fuel dispenser 105 and may provide an indication, in some instances, of an unauthorized movement or removal of the payment module 110 from the fuel dispenser 105. In particular aspects, visual and/or auditory indicator 117 may be exclusively a visual indicator, such as, for example, a strobe light or rotating beacon. In some aspects, indicator 117 may be exclusively an auditory indicatory, such as a siren or alarm. Indicator 117, however, may combine both forms of notification, such that a visual indication (e.g., a beacon) and an auditory indication (e.g., a siren) are activated upon the unauthorized removal or tampering with the payment module 110. Although illustrated as coupled to the fuel dispenser 105 at a top portion of the dispenser structure, visual and/or auditory indicator 117 may be located on any appropriate portion of the fuel dispenser 105, or adjacent to fuel dispenser 105.

Pumping mechanism 119 is coupled to fuel dispenser 105 and operates to pump a customer-chosen fuel from a fuel storage tank through nozzle 107 so that a retail customer may refuel a vehicle. Pumping mechanism 119, generally, is any type of positive displacement mechanism, including valves and fuel conduit, appropriate to a retail fueling environment. Although illustrated as physically coupled to fuel dispenser 105 in FIG. 1, pumping mechanism 119 may be located at the fuel storage tank and may operate through commands received from, for instance, the fuel dispenser 105, POS terminal 120, or remote monitoring server 125, as appropriate. Pumping mechanism 119 may also be disabled by the payment module 110, POS terminal 120, or remote monitoring server 125, should an unauthorized action occur, such as, for example, an unauthorized movement or removal of payment module 110 within fuel dispenser 105. Upon disablement, pumping mechanism 119 may be unable to pump the customer-chosen fuel from the fuel storage tank through nozzle 117.

Continuing with FIG. 1, POS terminal 120 is connected to fuel dispenser 105 through communication link 130a. POS terminal 120 may also be communicably connected to remote monitoring server 125 and a variety of other networks or services, such as, for example, a payment verification service provided by a credit or debit card company or financial institution. In some aspects, POS terminal 120 is located within the premises of a retail fuel environment such as a gasoline station, retail convenience store, grocery stores, or "big box" retailer. In particular aspects, POS terminal 120 may be located within a commercial or fleet fueling center, where, for instance, commercial vehicles may be refueled exclusive of the presence of private vehicles. POS terminal 120 may also be located remote from fuel dispenser 105. Regardless of the location of POS terminal 120, the terminal 120 may include a visual and/or auditory notification 122, i.e., an alarm, which may be activated upon the unauthorized removal or movement of the payment module 110 within the fuel dispenser 105.

Generally, POS terminal 120 may be any device which monitors one or more fuel dispensers 105 and acts to authorize fueling transactions. The POS terminal 120, in some aspects, may be the main controller (or computer) that controls and coordinates the activities of system 100. In some embodiments, more than one POS terminal 120 may be present within the system 100. Generally, POS terminal 120 includes memory, as well as one or more processors, and comprises an electronic computing device operable to receive, transmit, process, store, or manage data associated with the system 100. Generally, this disclosure provides merely one example of computers that may be used with the disclosure. As used in this document, the term "computer" is intended to encompass any suitable processing device. For example, POS terminal 120 may be implemented using computers other than servers, as well as a server pool. Indeed, POS terminal 120 may be adapted to execute any operating system including Linux, UNIX, Windows Server, or any other suitable operating system. According to one embodiment, POS terminal 120 may also include or be communicably coupled with a web server and/or a mail server.

Remote monitoring server 125 is communicably coupled to fuel dispenser 105 through communication link 130b. In some aspects, remote monitoring server 125 may be a main controller (or computer) that controls and coordinates the activities of system 100, rather than POS terminal 120. In particular aspects, remote monitoring server 125 is one of many computers or servers within a financial authorization network (not shown), such as, for example, a credit card, debit card, or financial institution network. The financial authorization network may receive a customer's financial and/or personal information from a component of system 100, such as remote monitoring server 125, POS terminal 120, and/or fuel dispenser 105, and authorize the dispensing of fuel from nozzle 107. Remote monitoring server 125, although shown as a single server 125, may include multiple servers 125. Moreover, in particular aspects, remote monitoring server 125 may include a visual and/or auditory indicator 127 (e.g., an alarm), which may be activated upon the unauthorized removal or movement of the payment module 110 within the fuel dispenser 105. While illustrated as communicably decoupled in FIG. 1, remote monitoring server 125 and POS terminal 120 may communicate over or through a communication link similar to communication links 130a and 130b.

FIG. 2A is a block diagram of one implementation of a payment module 200, which may be utilized in component removal detection system 100. Payment module 200 includes a payment module controller board 220, a payment module display 225, and a payment module keypad 230. Generally, the payment module 200 allows for secure, e.g., encrypted, communications between one or more components of a retail fueling environment, such as system 100, of sensitive data, such as a customer's financial or personal information utilized when purchasing fuel.

Payment module controller board 220 includes a payment module controller 205, a movement detection device 210, a bypass device 215, and a memory 218. As illustrated, payment module controller board 220 is communicably coupled to payment module display 225 and payment module keypad 230. In some aspects, payment module controller board 220 may be a printed circuit board, including logic and other electronic hardware.

Payment module controller 205 is located on payment module controller board 220 and provides, for instance, processing capability to the payment module controller board 220. Generally, the payment module controller 205 executes instructions and manipulates data to perform the operations of the payment module 200. Although described as a single payment module controller 205 in payment module 200, multiple payment module controllers 205 may be used according to particular needs, and references to payment module controller 205 are meant to include multiple controllers 205 where applicable. In certain aspects, payment module controller 205 executes the encryption and decryption operations for data received at the payment module 200. Examples of the data received at the payment module 200 may include magnetic card data from a card reader utilized as, for example, fuel dispenser component 115*a*, as well as a customer's financial or personal information for encryption or decryption. In order to encrypt and decrypt the data, the payment module controller 205 may access one or more stored secure keys 219 within memory 218.

Movement detection device 210 is located on payment module controller board 220 and communicably coupled to payment module controller 205 though a bypass device 215. Generally, movement detection device 210 senses any movement, e.g., rotation or displacement, of the payment module 200 within a fuel dispenser, such as fuel dispenser 105. Although illustrated as a single movement detection device 210, multiple movement detection devices 210 may be utilized without departing from the scope of this disclosure. In some aspects, the movement detection device 210 may be an accelerometer, which detects a change in the acceleration due to gravity (g) upon a rotation or displacement of the payment module 200. The accelerometer may be a one-, two-, or three-axis accelerometer. For instance, movement detection device 210 may be a single, three-axis accelerometer, which may detect changes in the acceleration due to gravity in three dimensions. In particular aspects, the movement detection device 210 may be a low g (1.5 to 6 g), three-axis accelerometer. In some aspects, payment module 200 may utilize two, two-axis accelerometers as movement detection devices 210, thereby also allowing the detection of changes in the acceleration due to gravity in three dimensions. However, in some implementations, movement detection device 210 is any appropriate device capable of sensing displacement and/or rotation of the payment module 200 within the fuel dispenser 105 and providing an electronic output representative of such a displacement or rotation.

Continuing with FIG. 2A, memory 218 is communicably coupled to payment module controller 205. Memory 218 may include any memory or database module and may take the form of volatile or non-volatile memory including, without limitation, magnetic media, optical media, random access memory (RAM), read-only memory (ROM), removable media, or any other suitable local or remote memory component. For example, memory 218 may store public and private key pairs, symmetric keys, public key certificates, applications, backup data, or other information that includes any cryptographical data, parameters, variables, algorithms, instructions, rules, or references thereto. The memory 218 may also include any other appropriate data for proper operation of the payment module controller 205 specifically and the payment module 200 in general. Memory 218 may include specifically, among other data, one or more secure keys 219. Secure keys 219 may allow, within a public key infrastructure (PKI), for the encryption and decryption of sensitive data, such as a customer's financial or personal information. This information may include, for example, a payment card number, a payment card expiration date, a payment card verification code, or a customer's personal identification numbers (PIN).

Generally, bypass device 215 allows for low pass filtering of the accelerometer 210 signal output in order to, for instance, prevent false alarms due to incidental movement of the payment module 200 within fuel dispenser 105 caused by, for example, vibration due to vehicle movement near the fuel dispenser 105, movement caused by wind load on the fuel dispenser 105, or other natural events causing displacement of the payment module 200 within fuel dispenser 105. In particular aspects, bypass device 215 is a digital low pass filter. For example, accelerometer 210 may be set up for a 64 Hz sampling rate and bypass device 215 may receive sixteen signal output values, e.g., values representative of dynamic changes in acceleration due to gravity along each dimension, from the accelerometer 210. Bypass device 215 may calculate an average of the sixteen values and compare it to an adjustable threshold value stored on, in some instances, memory 218. If the calculated average exceeds the adjustable threshold value, the bypass device 215 may transmit an output to payment module controller 205 indicating that a security feature should be activated. If the calculated average does not exceed the adjustable threshold value, the bypass device 215 may not transmit the output to the payment module controller 205 indicating that the security feature should be activated.

Figure 2B:
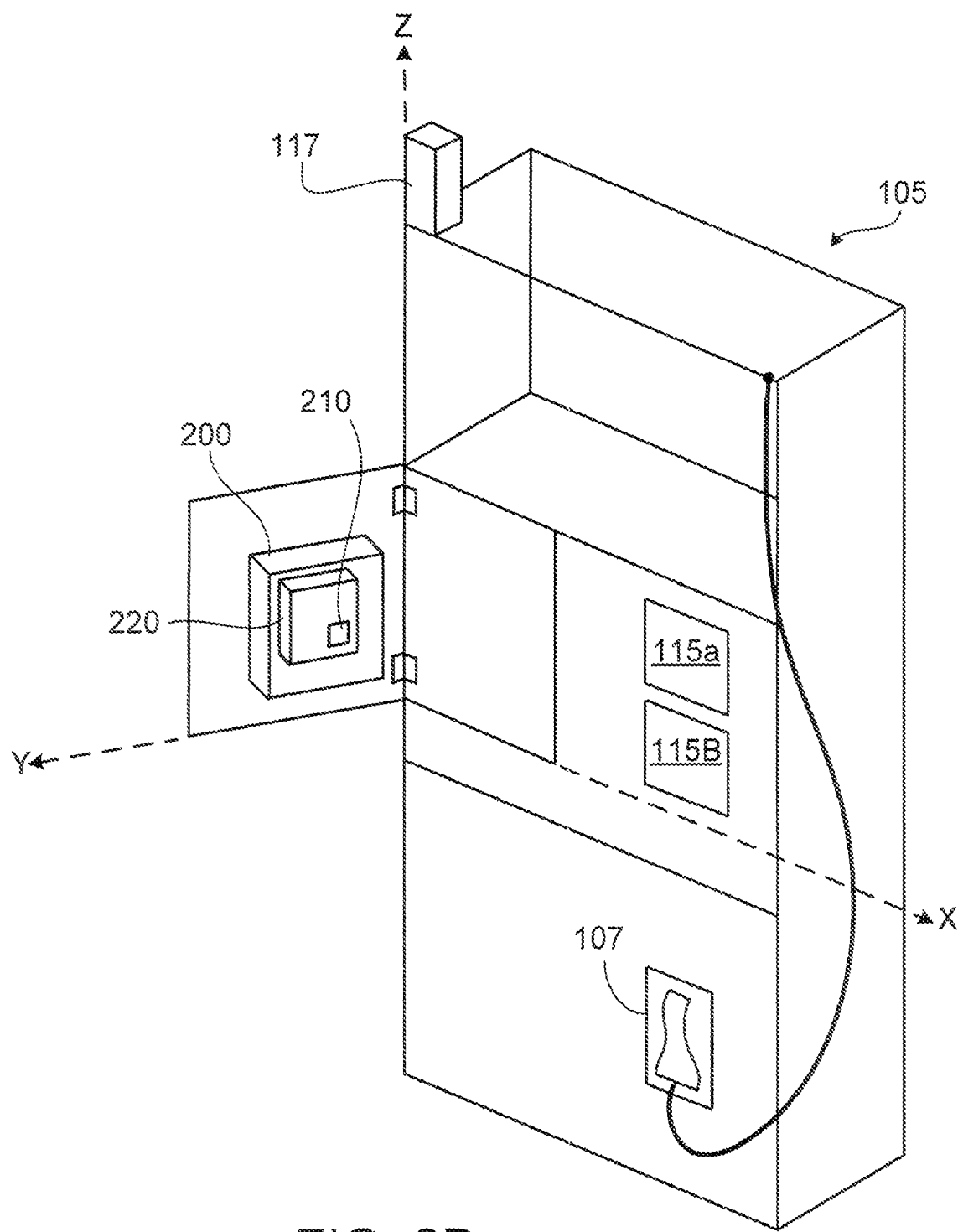
FIG. 2B is a three-dimensional perspective view of one implementation of a payment module in a fuel dispenser for use in a system for detecting component removal.

The operation of the movement detection device 210, e.g., a three-axis, low g accelerometer 210, may be generally as follows. In particular aspects, once the payment module 200 is installed at a fixed location within fuel dispenser 105, the accelerometer 210 is calibrated such that any movement or rotation of the payment module 200 is measured relative to its fixed position in the fuel dispenser 105. In some aspects, movement or rotation of the payment module 200 may be measured relative to the support surface on which the fuel dispenser 105 sits. Thus, movement or rotation of the fuel dispenser 105 while the payment module 200 remains in its fixed position may not trigger any output in the accelerometer 210, e.g., an analog voltage output or a pulse width modulated (PWM) digital output. With reference to FIG. 2B, once installed in the payment module 200, three gravity vectors may be established relative to the fixed position of the accelerometer 210. The three gravity vectors correspond to the three dimensions in which the accelerometer 210 may be displaced or rotate about. While the accelerometer 210 may be installed such that a rotation about an axis parallel to the force of gravity is approximately zero, in some instances, the payment module 200 may not be absolutely level in all three dimensions upon installation of the accelerometer 210. Thus, the accelerometer 210 may be recalibrated to account for any initial rotational offset from the axis parallel to the direction of earth's gravity, so as to make the fixed position of the accelerometer 210 within the payment module 200 a baseline position.

Once the accelerometer 210 is installed and calibrated, it may begin detecting any dynamic or static changes in acceleration due to gravity, i.e., any displacements or rotations of the payment module 200 within the fuel dispenser 105, respectively. For example, when the payment module 200 is rotated from its fixed position about any axis, the accelerometer 210 may detect the change in static acceleration of the payment module 200 and transmit an output representative of this change, such as, for example, a digital PWM output. Further, if the payment module 200 is displaced along one or more dimensions, the accelerometer 210 may detect this change in dynamic acceleration of the payment module 200 and transmit an output representative of this change. In some aspects, the output representative of the change in dynamic acceleration may be an analog output, which may be converted to a digital signal by another component, such as payment module controller 205.

If the accelerometer 210 senses a rotation about or displacement along one or more dimensions, accelerometer 210 transmits a signal output representative of such a rotation or displacement to payment module controller 205 through bypass device 215. Bypass device 215 is communicably coupled to movement detection device 210 and payment module controller 205 in payment module 200. Bypass device 215 is illustrated in FIG. 2A as separate from payment module controller 205; however, in some aspects, bypass device 215 may be implemented as logic or software, as appropriate, integral with payment module controller 205.

Values representative of displacement or rotation of the payment module 200 within the fuel dispenser 105 may then be received by the payment module controller 205 and evaluated to determine if a security measure should be activated. For example, adjustable values representative of rotational and displacement tolerances may be chosen and preprogrammed into the payment module controller 205 or saved in memory 218. In certain aspects, the adjustable tolerance value representative of rotation may be 5 degrees absolute and the adjustable tolerance value representative of displacement may be 0.1 g absolute. Should the accelerometer 210 transmit a value representative of a rotation of the payment module 200 within the fuel dispenser greater than the adjustable rotational tolerance (e.g., greater than 5 degrees absolute), the payment module controller 205 may activate a security feature on the payment module 200. In some implementations, the security feature may be the erasure of the secure keys 219 stored in memory 218, thus preventing a thief from compromising any sensitive data, such as a customer's financial or personal information. In certain aspects, the security feature may be the disabling of fueling mechanism 119 by the payment module 200 or the activation of one or more visual and/or auditory indicators 117, 122, and 127. Likewise, a representative displacement value transmitted from the accelerometer 210 greater than the adjustable displacement threshold value (e.g., greater than 0.1 g absolute in any of three dimensions) may also cause activation of the security feature by the payment module controller 205.

Known, authorized movement or rotation of the payment module 200 may be allowed without activation of the security feature. Referencing FIG. 2B, in some aspects, the payment module 200 may be attached to a hinged door, which, when closed, allows the payment module 200 to be set at the fixed position within the fuel dispenser 105. Should the payment module 200 require servicing, however, opening of the hinged door may induce a rotation of the accelerometer 210 greater than the preprogrammed, adjustable rotational tolerance, thus causing the payment module controller 205 to activate the security measure. In particular implementations, however, the rotational value corresponding to the opening (or closing) of the hinged door may be compared to preprogrammed values stored on, for instance, memory 218, which correspond to the known, authorized movements, by the payment module controller 205, thus allowing the door to open and close without unnecessary activation of the security feature. Moreover, in certain aspects, the hinged door to which the payment module 200 is coupled may only be opened by an authorized fuel dispenser service provider through, for example, a use of an authorization code or at particular time periods.

Continuing with FIG. 2A, payment module display 225 is communicably coupled to payment module controller 205 and payment module keypad 230 and generally allows for fuel dispenser transaction data to be viewed by a customer. The transaction data may be generated from the fuel dispenser 105 itself, or may also be generated by POS terminal 120 or remote monitoring server 125. The transaction data may also be data entered by the customer, allowing the customer to visually confirm that the correct data has been entered. For instance, data entered by the customer may include a PIN, a vehicle odometer value, or any other appropriate customer data entered during a fueling transaction. Although illustrated in FIG. 2A as integral with payment module 200, payment module display 225 may be a general customer display module as fuel dispenser component 115a or 115b. Thus, payment module display 225 may be separate from the payment module 200 yet still communicably coupled with payment module controller 205. Further, in some aspects, payment module display 225 may not be communicably coupled to payment module keypad 230 but may receive any appropriate data generated by payment module keypad 230 through payment module controller 205.

Payment module keypad 230 is communicably coupled to payment module controller 205 and payment module display 225. Payment module keypad 230 includes a set of alphanumeric keys 240 (shown in FIG. 2A as, for example, twelve alphanumeric keys 240) and a set of function keys 235 (shown in FIG. 2A as, for example, eight function keys 235). Generally, payment module keypad 230 allows a customer in a retail fuel dispensing environment, such as system 100, to input data, for example, financial or personal information required to complete a fuel dispensing transactions. Moreover, payment module keypad 230 may allow the customer to respond to requests or commands generated by, for example, the fuel dispenser 105, POS terminal 120, or remote monitoring server 125. Such requests or commands may include, for example, a request to enter a PIN, a command to choose a type and/or quality of fuel, or an inquiry into the customer's decision to purchase a cross-marketed product, such as a car wash. Although illustrated in FIG. 2A as integral with payment module 200, payment module keypad 230 may be a general keypad module as fuel dispenser component 115a or 115b. Thus, payment module keypad 225 may be separate from the payment module 200 yet still be communicably coupled with payment module controller 205. Further, in some aspects, payment module keypad 225 may not be communicably coupled to payment module display 230 but may only be communicably coupled to payment module controller 205, either directly, or though other appropriate logic or hardware.

A number of implementations have been described, and several others have been mentioned or suggested. Furthermore, those skilled in the art will readily recognize that a variety of additions, deletions, alterations, and substitutions may be made to these implementations while still achieving fuel dispenser component removal detection. For example, a movement detection device 210 may be secured to one or more fuel dispenser components, such as fuel dispenser component 115a or 115b. This may allow for a security feature to be activated upon the unauthorized rotation or displacement of the fuel dispenser component 115a or 115b within fuel dispenser 105. In certain implementations, the movement detection device 210 secured to the fuel dispenser component 115a or 115b may transmit one or more values representative of its rotation and displacement to payment module controller 205. As another example, the movement detection device 210 secured to the fuel dispenser component 115a or 115b may transmit one or more values representative of the rotation and displacement to a processor or controller distinct from the payment module controller 205 and located on, for example, the fuel dispenser component 115a or 115b, the fuel dispenser 105, POS terminal 120, or remote monitoring server 125. Thus, the scope of protected subject matter should be judged based on the following claims, which may capture one or more aspects of one or more implementations.

What is claimed is:

1. A system for component movement detection, the system comprising:
   a payment module;
   a fuel dispenser, the fuel dispenser adapted to receive the payment module and enclose the payment module at a first position, the first position defined by a fixed position of the payment module relative to the fuel dispenser; and
   a movement detection device, the movement detection device communicably coupled to the payment module and adapted to:
      detect a first value at the first position and a second value at a second position of the payment module, the second position different from the first position;
      transmit the first and second values second to the payment module, the payment module adapted to activate a security measure based upon a difference in the first and second values greater than an adjustable absolute limit;
      detect a third value at a third position of the payment module, the third position different from the first position, a difference in the first and third values greater than the adjustable absolute limit;
      match the difference of the first and third values to one of a plurality of stored differential values, each of the differential values corresponding to an authorized movement of the payment module relative to the first position including movement resulting from a servicing of the payment module; and
      transmit a signal to the payment module to prevent activation of the security measure based on the match.

2. The system of claim 1, wherein the movement detection device is integral with the payment module.

3. The system of claim 1, wherein the movement detection device comprises an accelerometer.

4. The system of claim 3, wherein the accelerometer is a low g, three-axis accelerometer.

5. The system of claim 1, the payment module comprising one or more secure keys, the payment module adapted to erase the secure keys upon activation of the security measure.

6. The system of claim 1 further comprising a bypass device communicably coupled to the movement detection device and payment module, the bypass device adapted to prevent activation of the security measure based upon a value average less than an adjustable threshold value.

7. The system of claim 6, the bypass device comprising a digital low pass filter.

8. The system of claim 6, the value average comprising an average of sixteen values, the values representing magnitude of acceleration of the payment module values.

9. The system of claim 1, wherein the first and second values are representative of at least one of the following:
   degree of rotation values of the payment module about an axis of rotation; and
   magnitude of acceleration values of the payment module.

10. The system of claim 9, wherein the adjustable absolute limit is approximately equal to at least one of five degrees of rotation or 0.1 g.

11. The system of claim 1, the payment module adapted to activate an alarm upon activation of the security measure, the alarm located at one or more of the following:
   a remote monitoring location;
   the fuel dispenser; and
   a point of sale terminal, the point of sale terminal communicably coupled to the fuel dispenser.

12. The system of claim 1, the payment module adapted to disable a fuel dispenser fueling mechanism upon activation of the security measure.

13. A method for detecting fuel dispenser component movement, the method comprising:
   locating a payment module in a fuel dispenser at a first position, the first position defined by a fixed position of the payment module relative to the fuel dispenser;
   detecting a first value at the first position by a movement detection device, the movement detection device communicably coupled to the payment module;
   detecting a second value at a second position of the payment module by the movement detection device, the second position different from the first position;
   transmitting the first and second values second to the payment module;
   activating a security measure based upon a difference in the first and second values greater than an adjustable absolute limit
   detecting a third value at a third position of the payment module, the third position different from the first position, a difference in the first and third values greater than the adjustable absolute limit;
   matching the difference of the first and third values to one of a plurality of stored differential values, each of the differential values corresponding to an authorized movement of the payment module relative to the first position including movement resulting from a servicing of the payment module; and
   transmitting a signal to the payment module to prevent activation of the security measure based on the match.

14. The method of claim 13, wherein the movement detection device is integral with the payment module.

15. The method of claim 13, wherein the movement detection device comprises an accelerometer.

16. The method of claim 13, wherein the accelerometer is a low g, three-axis accelerometer.

17. The method of claim 13, the payment module comprising one or more secure keys, the method further comprising erasing the secure keys upon activation of the security measure.

18. The method of claim 13 further comprising:
   transmitting a plurality of values to a bypass device, the bypass device communicably coupled to the movement detection device and the payment module;
   calculating a value average based on the plurality of values; and
   preventing activation of the security measure based upon the value average less than an adjustable threshold value.

19. The method of claim 18, the bypass device comprising a digital low pass filter.

20. The method of claim 18, the value average comprising an average of sixteen values, the values representing magnitude of acceleration of the payment module values.

21. The method of claim 13, wherein the first and second values are representative of at least one of the following:
   degree of rotation values of the payment module about an axis of rotation; or
   magnitude of acceleration of the payment module values.

22. The method of claim 13, wherein the adjustable absolute limit is approximately equal to at least one of five degrees of rotation or 0.1 g.

23. The method of claim 13 further comprising activating an alarm upon activation of the security measure, the alarm located at one or more of the following:

a remote monitoring location;

the fuel dispenser; and a point of sale terminal, the point of sale terminal communicably coupled to the fuel dispenser.

24. The method of claim 13 further comprising disabling a fuel dispenser fueling mechanism upon activation of the security measure.

25. A system for component movement detection, the system comprising:

a fuel dispenser module;

a fuel dispenser, the fuel dispenser adapted to receive the fuel dispenser module and enclose the fuel dispenser module at a first position, the first position defined by a fixed position of the fuel dispenser module relative to the fuel dispenser; and an accelerometer, the accelerometer communicably coupled to the fuel dispenser module and a processor and adapted to:

detect a first value at the first position and a second value at a second position of the fuel dispenser module, the second position different from the first position;

transmit the first and second values second to the processor, the processor adapted to activate a security measure based upon a difference in the first and second values greater than an adjustable absolute limit detect a third value at a third position of the fuel dispenser module, the third position different from the first position, a difference in the first and third values greater than the adjustable absolute limit;

match the difference of the first and third values to one of a plurality of stored differential values, each of the differential values corresponding to an authorized movement of the payment module relative to the first position including movement resulting from a servicing of the fuel dispenser module; and transmit a signal to the payment module to prevent activation of the security measure based on the match.

* * * * *

UNITED STATES PATENT AND TRADEMARK OFFICE
CERTIFICATE OF CORRECTION

Page 1 of 1

PATENT NO. : 7,902,993 B2
APPLICATION NO. : 11/846356
DATED : March 8, 2011
INVENTOR(S) : Stephen Michael DeMarco It is certified that error appears in the above-identified patent and that said Letters Patent is hereby corrected as shown below:

Col. 12, line 20, delete "limit" and insert -- limit; --, therefor.

Col. 12, line 38, delete "claim 13," and insert -- claim 15, --, therefor.

Col. 14, line 7, delete "limit" and insert -- limit; --, therefor.

Signed and Sealed this
Fourteenth Day of June, 2011

David J. Kappos
*Director of the United States Patent and Trademark Office*